UNITED STATES PATENT OFFICE.

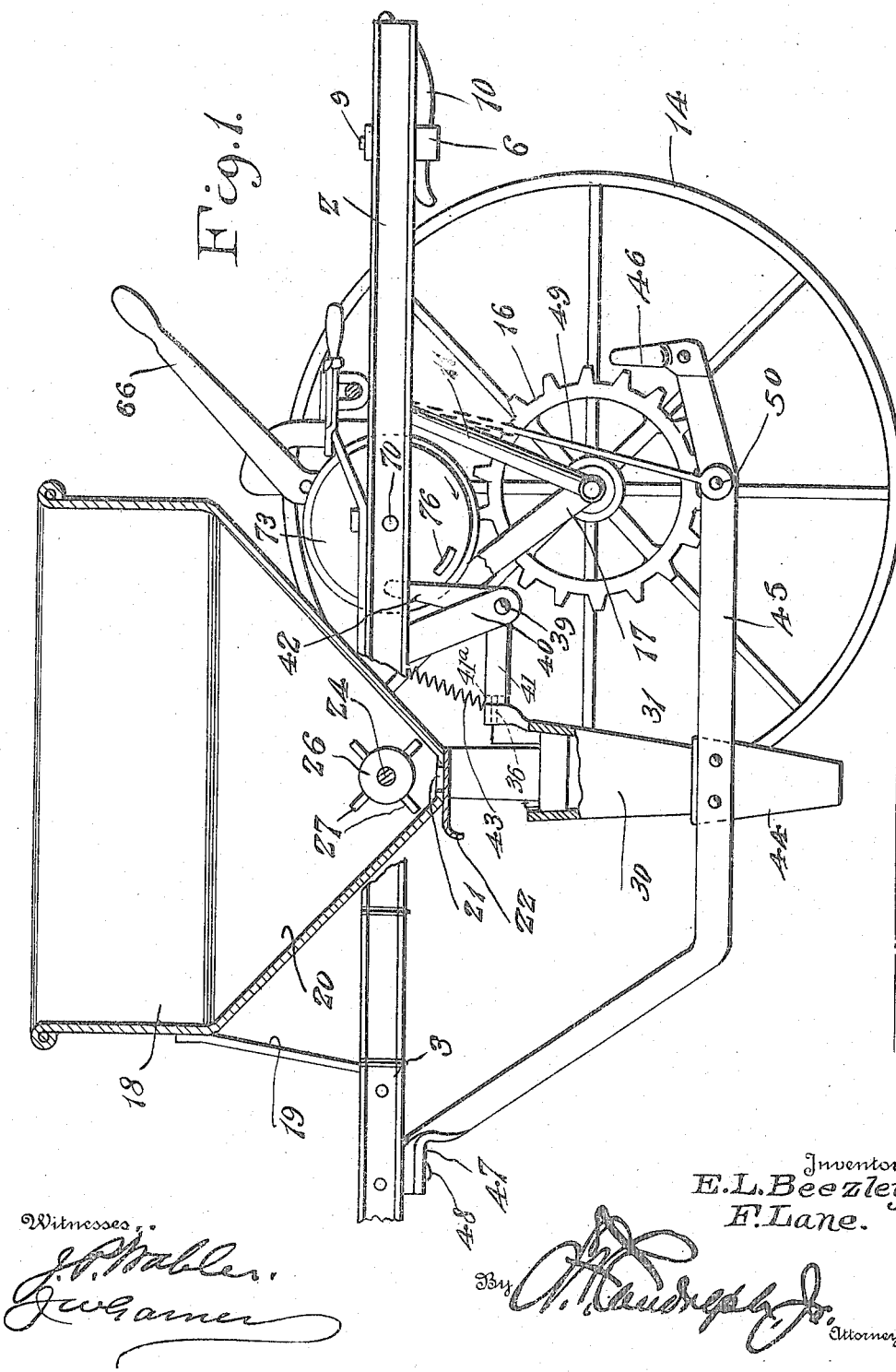

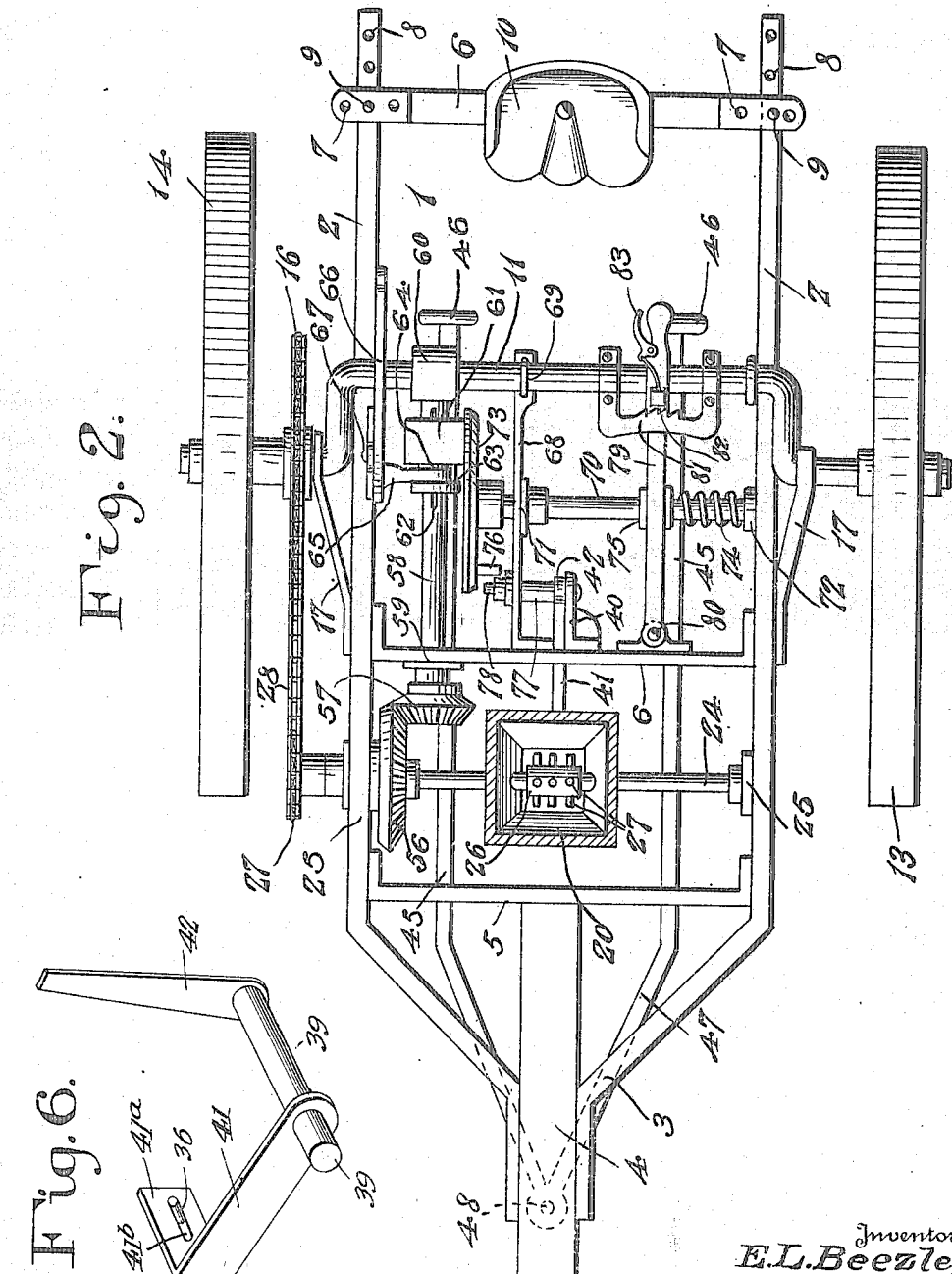

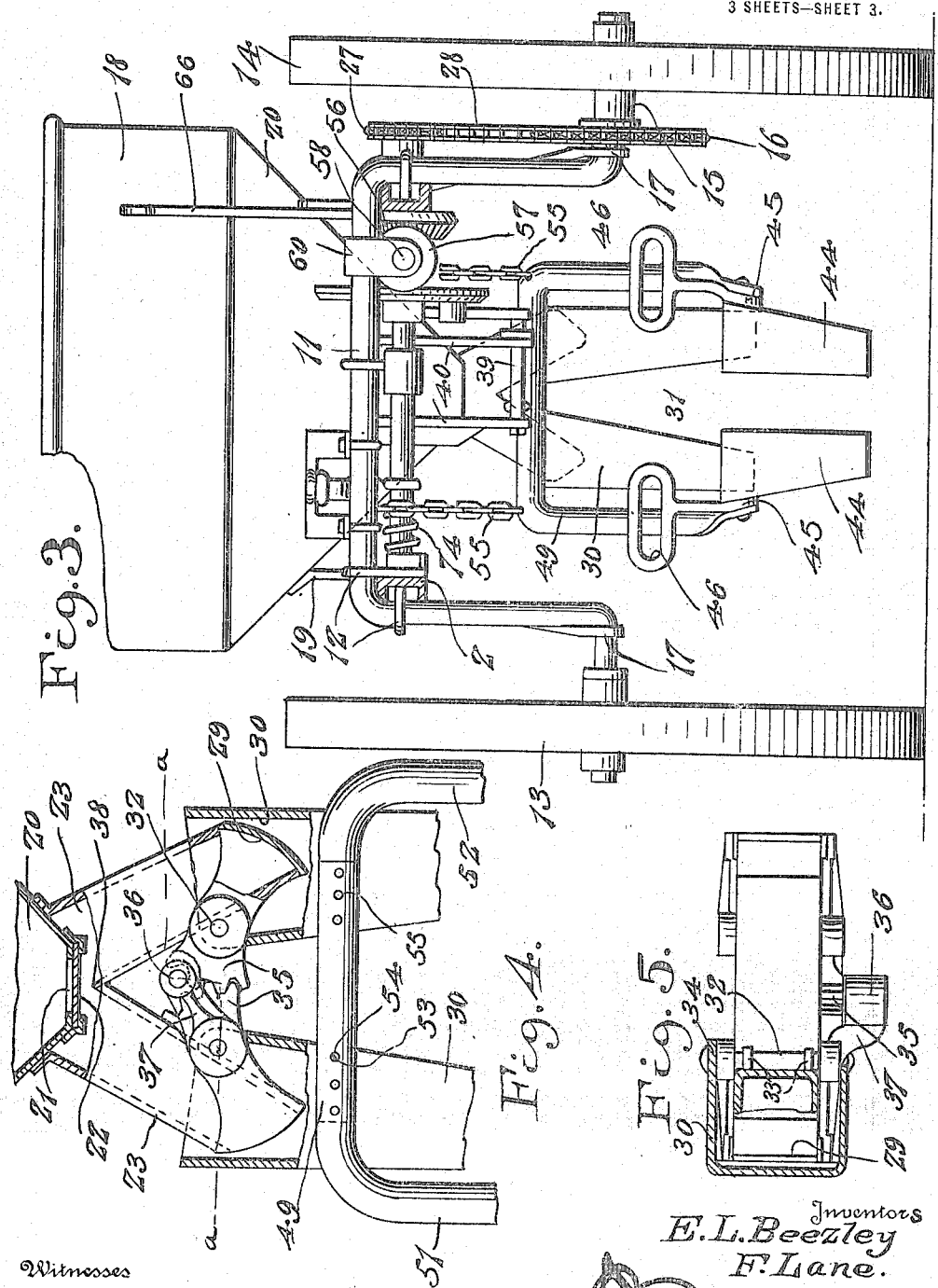

ERNEST L. BEEZLEY AND FRANK LANE, OF MOUNT PLEASANT, IOWA.

FERTILIZER-DISTRIBUTING MACHINE.

1,271,007. Specification of Letters Patent. Patented July 2, 1918.

Application filed May 3, 1915. Serial No. 25,567.

*To all whom it may concern:*

Be it known that we, ERNEST L. BEEZLEY and FRANK LANE, citizens of the United States, residing at Mount Pleasant, in the county of Henry and State of Iowa, have invented certain new and useful Improvements in Fertilizer-Distributing Machines; and we do hereby declare the following to be a full, clear, and exact description of the invention, such as will enable others skilled in the art to which it appertains to make and use the same.

This invention is an improved fertilizer distributing machine for dropping fertilizer or other material in hills or drills automatically as desired.

One object of the invention is to provide a machine of this character with fertilizer dropping valves of improved construction.

Another object is to provide improved means for actuating the fertilizer dropping valves.

With the above and other objects in view the invention consists in the construction, combination and arrangement of devices hereinafter described and claimed.

In the accompanying drawings:—

Figure 1 is partly an elevation and partly a vertical sectional view of a fertilizer distributing machine constructed in accordance with our invention.

Fig. 2 is a plan of the same.

Fig. 3 is a rear elevation of the same.

Fig. 4 is a detail view partly in section and partly in elevation of the lower portion of the hopper, the spouts, the shoes and adjacent parts.

Fig. 5 is a detail horizontal sectional view on the plane indicated by the line *a—a* of Fig. 4.

Fig. 6 is a detail perspective view of a part of the fertilizer distributer mechanism.

In the embodiment of our invention here shown a frame 1 is provided which comprises a pair of channeled side bars 2 having inturned front ends 3 between which the rear portion of the tongue 4 is secured, a pair of cross bars 5, 6 which are arranged and secured between the side bars 2 at the required distance from the front ends of said side bars, and a rear cross bar 6 which is adjustably secured on the rear portions of the bars 2, said cross bar 6 having adjusting openings 7 and said bars 2 having adjusting openings 8 for the reception of bolts 9 wherewith to secure said bar 6 at any desired adjustment, longitudinally or transversely with respect to the frame. The bar 6 carries the seat 10 for the driver.

We also provide an arched axle 11 the arch of which extends across the frame 1 at a suitable distance from the rear ends of said frame and is secured by clip bolts 12. Ground wheels 13, 14 are mounted on the spindles of the arched axle, and the wheel 14, which is here shown as on the right hand side of the machine has its hub 15 provided with a master sprocket wheel 16. Inclined braces 17 have their upper front ends secured on the sides of the frame 1 and their lower rear ends secured to the axle at points near the bases or inner ends of its spindles as shown.

A hopper 18 is mounted on the front portion of the frame, its supports being indicated at 19 and the hopper is an inverted conical bottom 20 provided with a discharge opening 21 and also with a cut off valve 22 to close said discharge opening or vary the effective area thereof as may be desired. A pair of downwardly diverging inclined spouts 23 extend from the bottom of the hopper and are arranged abreast of each other so that they extend toward opposite sides of the machine. A shaft 24 is arranged transversely of the frame, between the bars 5, 6, is mounted in bearings 25, extends across the lower portion of the hopper, a slight distance above the discharge opening 21, has a roller 26 in the discharge portion of the hopper and is provided at one end with a sprocket wheel 27 which is connected by an endless sprocket chain 28 with a master sprocket wheel 16. The roller 26 is provided with radial spurs 26$^a$. Said roller feeds the fertilizer or other material to the discharge opening 21 of the hopper and hence to the spouts 23 and the spurs of said roller also prevent the fertilizer from clogging in the hopper.

A pair of fertilizer dropping valves 29 are arranged for operation at the lower ends of the spouts 23 and in the upper members 30 of discharge shoes or spouts 31. These valves are provided with shafts 32 which are mounted in bearings 33 on the opposing sides of the spouts 23 and are also mounted in bearings 34 near the upper corners of the upper shoe members 30, so that the said valves are arranged for reciprocating oscillatory movement and said members 30 are pivotally mounted for vertical movement transversely of the machine, so that the lower ends of said shoe members 30 may be moved toward or from each other. The valves 29 are provided with co-engaging gear segments 35 and one of the valves also has a crank pin 36 extending rearwardly from a crank arm 37 formed with its segment. The valves may be of the form here shown or of any other suitable construction. Said valves normally close the lower ends of the spouts 23 so that fertilizer or other material dropped from the hopper into the upper ends of the spouts 23 is divided by the ridge 38 between said spouts and accumulates in the ends of said spouts on the valves 29. A rock shaft 39 is mounted in bearings in hangers 40 which depend from the frame and said rock shaft has an arm 41 which is connected with the crank pin 36, said rock shaft also having a tappet arm 42 which is arranged substantially at right angles to the arm 41. The arm 41 has its free end angled as at 41ª and is provided with a slot 41ᵇ through which the crank pin 36 extends. A spring 43 is connected to the arm 41 and serves to normally hold the valves in closed position. The valves, being intergeared, are movable simultaneously either to opened or closed position as the case may be, and as will be understood.

The upper shoe members 30 discharge into lower shoe members 44 which are secured to the inner sides of a pair of laterally movable beams 45. The said beams have foot rests or stirrups 46 at their rear ends and have their front ends upturned, forwardly converged and connected together as at 47 and pivotally mounted on a bolt 48 which extends downwardly from the tongue. The beams 45 are connected together at a point a suitable distance from their rear ends by a bail 49 the ends of which are pivotally connected to said beams as at 50. Said bail comprises a pair of members 51 which have overlapping arms 52 provided with adjusting openings 53, bolts 54 being arranged in appropriate adjusting openings and securing said arms together at any desired adjustment of the bail, and hence the bail can be widened or narrowed as desired to spread the rear ends of the beams 45 apart or narrowing space between them as required, and to hence correspondingly adjust the lower shoe members 44. The upper ends of the lower shoe members 44 are of greater diameter than the lower ends of the upper shoe members 30 so that the lower shoe members may be adjusted radially as required. Suspending chains 55 connect the bail 49 with the arched portion of the axle. Hence when the machine is in operation the driver may use his feet to sway the beams and the lower shoe members laterally as may be required to cause the fertilizer to be dropped in rows which are irregular and not straight.

We will now describe variable speed mechanism for operating the dropping valves 29 as slowly or as rapidly as may be desired according to the desired width of the spaces between the fertilizer dropped in the hills or rows. The shaft 24 which carries and revolves the feed roller 26 is provided near the right hand end with a beveled gear 56. This gear engages a smaller beveled gear 57 on the front end of a longitudinally arranged shaft 58 which has a bearing 59 in the cross bar 6 and also has a bearing 60 attached to the arch of the axle. A friction roller or wheel 61 is splined as at 62 on said shaft 58 for rotation therewith and for longitudinal movement thereon and is provided at its front side with a neck 63 which has an annular groove 64, the said groove being engaged by a suitable shipper fork or other suitable device 65 of an angled shipper lever 66 which is pivotally mounted at the right hand side of the frame as at 67. This lever may be readily grasped by the driver and may be employed to shift the friction wheel longitudinally on the shaft 58 as will be understood.

A longitudinally arranged bar 68 near the center of the frame has its front end secured to the cross bar 6 and its rear end secured as by means of a clip bolt 69 with the arch of the axle. A shaft 70 is mounted for revolution, and also for slight longitudinal movement in a bearing 71 in the bar 68 and a bearing 72 in the left hand side bar 2. At the inner end of said shaft 70 is a friction disk 73. A spring 74 is provided which is arranged on the outer portion of the shaft and the ends of which respectively bear against the bearing 72 and a collar 75 on said shaft, said spring serving to normally move the shaft inwardly and to normally keep the friction disk in frictional engagement with the friction wheel 61. Said friction disk is provided on its rear side with a tappet 76 which at each rotation of the friction disk with the shaft 70 serves to engage a tappet roller 77 on a crank pin 78 with which the arm 42 of the lever 41 is provided, the rotation of said disk being in the direction indicated by the arrow in Fig. 1 and said tappet as it passes the tappet roller strikes said tappet roller and hence causes the arm 42 to partly turn the lever 40 against the tension of the spring 43 and thereby move the valves 29 upwardly to open position, causing said valves to drop fertilizer therefrom down through the members of the shoes to the soil. By shifting the friction wheels 61 radially on the friction disk the speed of said disk and its shaft 70 may be varied as desired so that the valves 29 may be intermittently opened and closed at any desired rate of speed, according to the distance between the spaces where it is desired to deposit fertilizer.

To put the valve operating mechanism in or out of operation as desired we provide a lever 79 which is pivotally mounted at its front end as at 80 and which co-acts with a ratchet toothed segment 81 mounted on the arch of the axle. The lever also has a dog 82 for engaging a desired ratchet tooth of the segment and a finger grip 83 for operating said dogs. This lever engages an annular groove in the collar 75 of the shaft 70 and hence may be employed to shift said shaft to cause the disk 73 to engage or disengage the friction wheels 61 as may be desired.

It will be understood from the foregoing that our improved fertilizer distributing machine is entirely under control of the operator, and independently of the speed with which it may be drawn by the team, its dropping mechanism may be operated at any desired rate of speed. The shoes or spouts through which the fertilizer drops to the hills or drills or rows, may also, as hereinbefore stated, be guided and adjusted toward and from each other as may be desired. While the machine is especially adapted for use for distributing fertilizer it may be also employed for dropping seeds or for other like uses, and hence we do not desire to limit ourselves in this particular.

While we have herein shown and described a preferred form of our invention we would have it understood that changes may be made in the form, proportion and arrangement of the several parts without departing from the spirit of our invention and within the scope of the appended claims.

Having thus described our invention we claim:—

1. In a fertilizer distributer structure, a hopper having a dispensing outlet, a pair of spouts communicating with said outlet, delivery chutes positioned for receiving fertilizer from said spouts, shafts rockably carried by the upper end of said chutes, valves mounted upon said shaft and normally closing the outlets of said spouts, means for rocking one of said shafts for moving one of said valves into an opened position, and means connecting said valves for moving them in unison.

2. In a fertilizer distributer structure, a hopper having a dispensing outlet, a pair of spouts communicating with said outlet, delivery chutes positioned for receiving fertilizer from said spouts, shafts rockably carried by said chutes, valves mounted upon said chutes and normally closing the outlets of said spouts, means for rocking one of said shafts for moving one of said valves into an opened position, co-engaging gear segments formed upon said valves for operating the valves in unison, and means for controlling the flow of fertilizer from said hopper into said spouts.

3. In a fertilizer distributer structure, a hopper having a dispensing outlet, a pair of spouts communicating with said outlet, delivery chutes positioned for receiving fertilizer from said spouts, shafts rockably carried by said chutes, valves mounted upon said shafts and normally closing the outlets of said spouts, a crank arm formed upon one of said valves, a crank pin carried by the outer end of said arm, a rockable bell crank, one arm of said bell crank being adapted for engagement with said crank pin for rocking said valve member for moving it into an opened position, and means connecting said valves for moving them in unison.

4. In a fertilizer distributer structure, a hopper having a dispensing outlet, a pair of spouts communicating with said outlet, delivery chutes positioned for receiving fertilizer from said spouts, shafts rockably carried by said chutes, valves mounted upon said shafts and normally closing the outlet of said spouts, a crank arm formed upon one of said valves, a crank pin carried by the outer end of said arm, a rockable bell crank, one arm of said bell crank being adapted for engagement with said crank pin for rocking said valve member for moving it into an opened position, co-engaging gear segments formed upon said valves for moving them in unison, and means operatively connected to said bell crank for returning said bell crank and valves to their normal position.

In testimony whereof we affix our signatures in presence of two witnesses.

ERNEST L. BEEZLEY.
FRANK LANE.

Witnesses:
M. L. POULTER,
T. C. POULTER.

Copies of this patent may be obtained for five cents each, by addressing the "Commissioner of Patents, Washington, D. C."